United States Patent [19]
Chuang et al.

[11] Patent Number: 5,551,474
[45] Date of Patent: Sep. 3, 1996

[54] GAS FLOW DIRECT PRESSURE REGULATOR

[76] Inventors: Rung-Chao Chuang; Hut N. Chuang, both of No. 869, San Fong Rd., Fung Yuan, Taichung Hsien, Taiwan

[21] Appl. No.: 492,792

[22] Filed: Jun. 20, 1995

[51] Int. Cl.⁶ .............................. F16K 31/14; G01L 7/00
[52] U.S. Cl. .............. 137/495; 137/624.11; 137/624.12; 73/756
[58] Field of Search .................... 137/624.11, 624.12, 137/495

[56] References Cited

U.S. PATENT DOCUMENTS

| | | | |
|---|---|---|---|
| 4,043,350 | 8/1977 | Ichimi et al. | 137/39 |
| 4,168,864 | 9/1979 | Weeks | 406/23 |
| 4,572,176 | 2/1986 | Walther | 128/204.26 |
| 4,787,416 | 11/1988 | Chuang | 137/624.12 |
| 4,836,247 | 6/1989 | Chuang | 137/624.12 |
| 4,986,302 | 1/1991 | Chuang | 137/495 |

*Primary Examiner*—Richard Chilcot
*Assistant Examiner*—Paul D. Amrozowicz
*Attorney, Agent, or Firm*—Bacon & Thomas

[57] ABSTRACT

Disclosed is an improvement to a direct pressure regulator including a timer device, transmission means, and a valve controlling the gas flow. The improvement is characterized in that the transmission means that transmits power from the timer device to the valve includes an indirect transmission member that transmits the power indirectly rather than directly as in the prior art. The structure allows the assembly of the constituent parts of the direct pressure regulator to be much more easily accomplished. No adjustment or calibration is needed after the assembly. Manufacture cost and fault rate are both significantly reduced.

2 Claims, 5 Drawing Sheets

GAS FLOW DIRECT PRESSURE REGULATOR

BACKGROUND OF THE INVENTION

1. Field of the Invention

The present invention relates to a gas flow direct pressure regulator, and more particularly to an improvement to a direct pressure regulator which can regulate the flow of gas responsive to the gas pressure.

2. Description of Prior Art

It is known to the person skilled in the art that in a central gas supply system the gas flow gets lower and lower as the gas approaches the terminal of the piping. At peak utilization hours, as at dinner hours, the gas flow at the terminal is particularly low. In conventional gas flow regulators, the gas passage is mostly provided in such a zigzag way that the pressure difference between the inlet and the outlet of the gas flow regulator is large. In low-pressure gas supply systems, which has a gas pressure as low as $0.01 kg/cm^2$, the gas pressure at the terminal is low enough to cause an insufficient supply of gas to the user. In winter days, this would cause the heating capacity to be very low.

To cope the aforementioned problem, the inventor has proposed a gas flow regulator disclosed in UK Patent Application GB 2,233,068A entitled "A Direct Pressure Regulator Which is Responsive to Fluid Pressure". The patent can solve the problem of insufficient gas supply in winter days. The structure of the prior art regulator is shown in FIGS. 1 and 2.

There are found several drawbacks of the prior art regulator that, as shown in FIG. 2, the bottom chamber is in direct communication with the top chamber and each of which is air-tight separated. In factory, such a structure arrangement causes two constituent parts of the timer device, namely the cam and the main shaft, not to be able to be assembled beforehand and the work has to be done after the assembly of the timer device on the regulator is completed. Working hours for the labor in making the assembly is thus time-consuming. Moreover, if the timer device fails or is under maintenance so that it must be replaced, the technician must shut off the gas supply first and then remove the screws 33, washer 32, and cam 31 (shown in FIG. 1) and then the bottom cover (not shown) on the top chamber and the mounting plate 48 for the timer device before the timer device can be removed. The work, as anybody can realize, is quite laborious and time-consuming. After replacement for the timer device is completed, the cutaway portion 310 of the cam 31 on the timer device must be precisely aligned with the swinging arm 21, and after that, adjust the two components in specific orientations. This work is also laborious and time-consuming.

In addition to the foregoing drawbacks, the prior art regulator, as shown in FIG. 1, is composed of at least 27 various components. The assembly work is thus time-consuming. In particular, the assembly of the valve bar 13 and the valve piece 11 must employ high-end technology. In that, the valve bar 13 is formed by machining a copper bar and then handed to the injection molding plant, where specialized personnel operates the injection molding to integrally form the valve bar 13 with the valve piece 11. This procedure is necessary because the valve piece 11 is formed with a protruded member 110 and slits 111 and the valve bar 13 has its end formed with grooves for coupling with an E-type buckling ring 16 so that the two components can not be easily integrally formed with plastics. To do it, the cost for the molds is extremely high.

SUMMARY OF THE INVENTION

It is therefore a primary objective of the present invention to provide an improvement to the prior art direct pressure regulator in which the aforementioned drawbacks are not seen.

It is another objective of the present invention to provide an improvement to the prior art direct pressure regulator which is easy to assemble.

It is still another objective of the present invention to provide an improvement to the prior art direct pressure regulator which is easy to maintain.

It is yet another objective of the present invention to provide an improvement to the prior art direct pressure regulator which provides a straight route for the gas flow instead of a zigzag route so as not to decrease the pressure difference between inlet and outlet.

In accordance with the foregoing and other objectives of the present invention, there is provided with an improvement to the prior art direct pressure regulator. The direct pressure regulator includes a casing having a top chamber and a bottom chamber. The bottom chamber includes a gas passage having an inlet and an outlet. An air-sealing member is provided between the top chamber and the bottom chamber. A timer device is provided within the top chamber and has its axis provided with a cam driving a horizontal transmission member. A supporting member is provided for supporting the timer device within the top chamber. A vertical transmission member is provided with one end coupled to the timer device supporting member and which is used to convert horizontal movement of the horizontal transmission member into vertical movement. A direct pressure valve is provided between the inlet and outlet of the gas passage in the bottom chamber. To the foregoing structure, the improvement according to the present invention includes the provision of an indirect transmission member provided air-tight within the bottom chamber. The indirect transmission member includes a pivoted L-shaped piece having a base portion and a triangular portion. The L-shaped piece is pivoted by means of a pair of ears provided on the base portion and the triangular portion is coupled to the direct pressure valve such that when the L-shaped piece is pivoted, the direct pressure valve being actuated to open to allow gas to pass through the gas passage.

In the improvement according to the present invention to the prior art direct pressure regulator, the main difference is the change of direct transmission to indirect transmission and the provision of valve bars to be fixed at both ends. The structure can allow the assembly of constituent parts much more easily. A particular benefit is that the shaft and the cam used in the timer device can be assembled well beforehand in the factory. In assembly or replacement, the cam need not be removed and then replaced so that manufacture cost as well as possibility of failure are both significantly lowered. Even though one product is at fault, it can be easily repaired. Therefore, it is an important aspect of the present invention that the output power from the shaft of the timer device is indirectly transmitted through the cam, vertical and horizontal transmission members, and the indirect transmission member to open/close the valve. The provision of the indirect transmission member is therefore the main spirit of the present invention.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
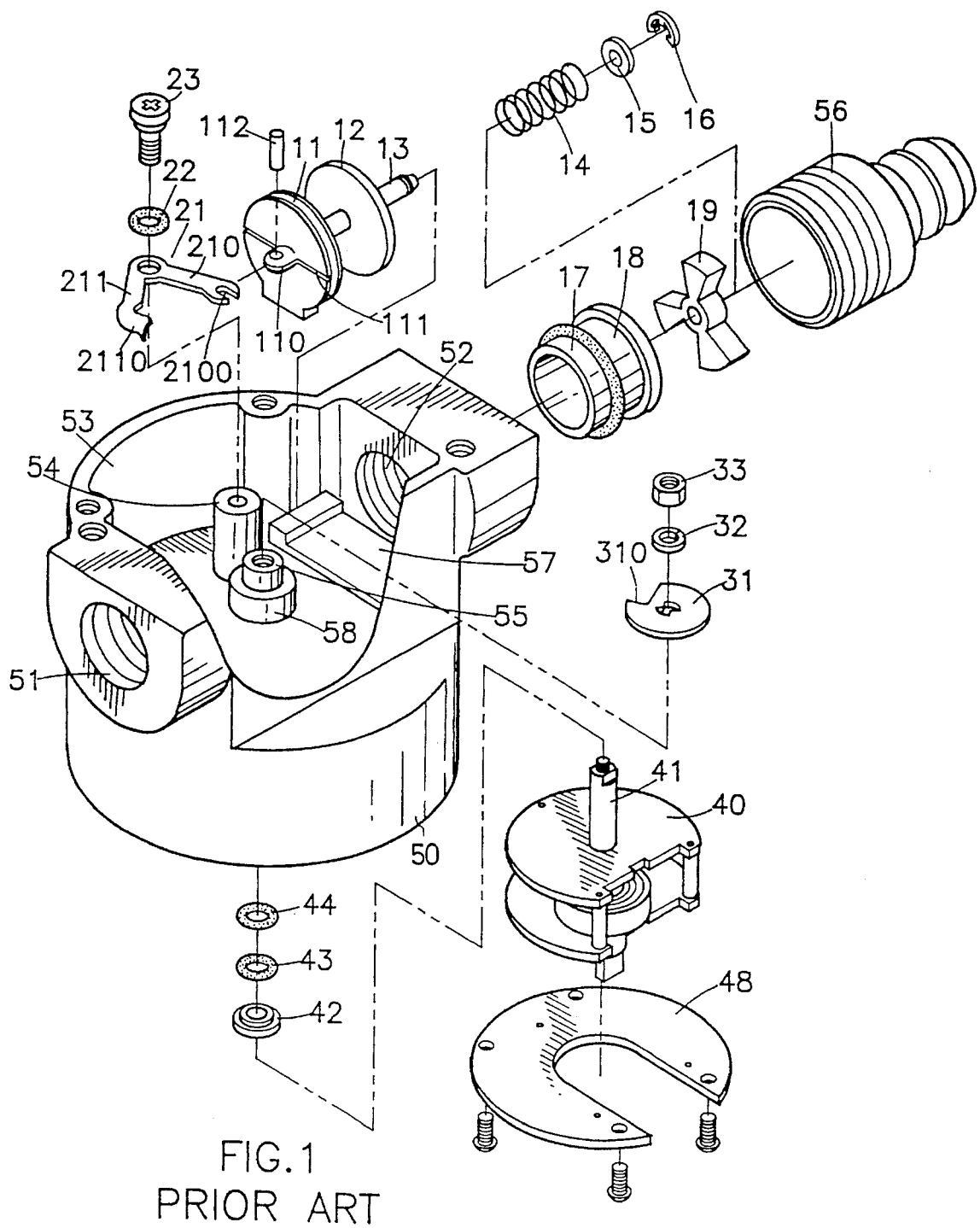
FIG. 1 shows a perspective exploded view of a prior art gas flow direct pressure regulator.
Figure 2:
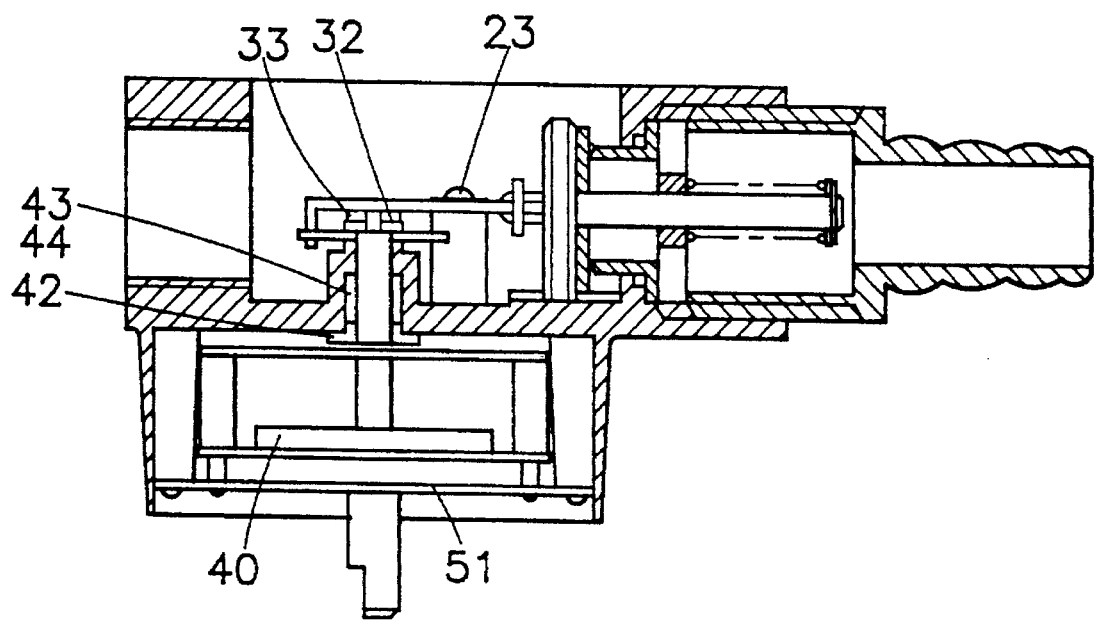
FIG. 2 shows a side view of the prior art direct pressure regulator of FIG. 1 when it is assembled.
Figure 3:
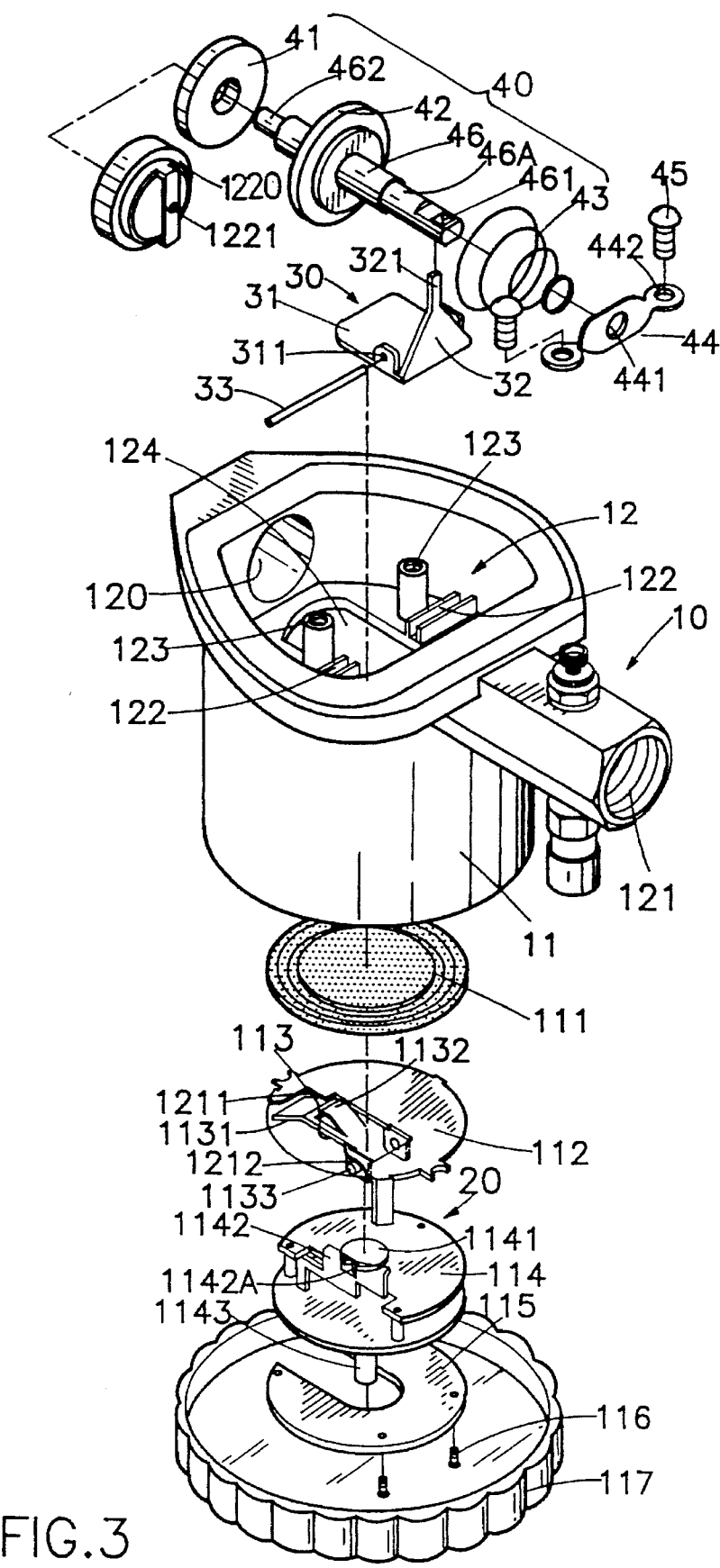
FIG. 3 shows a perspective exploded view of a gas flow direct pressure regulator according to the present invention.
Figure 3A:
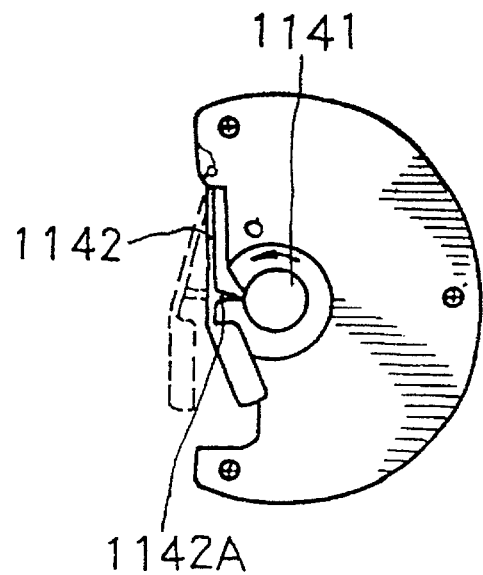
FIG. 3A shows a top view of a timer device employed in the direct pressure regulator according to the present invention.
Figure 4:
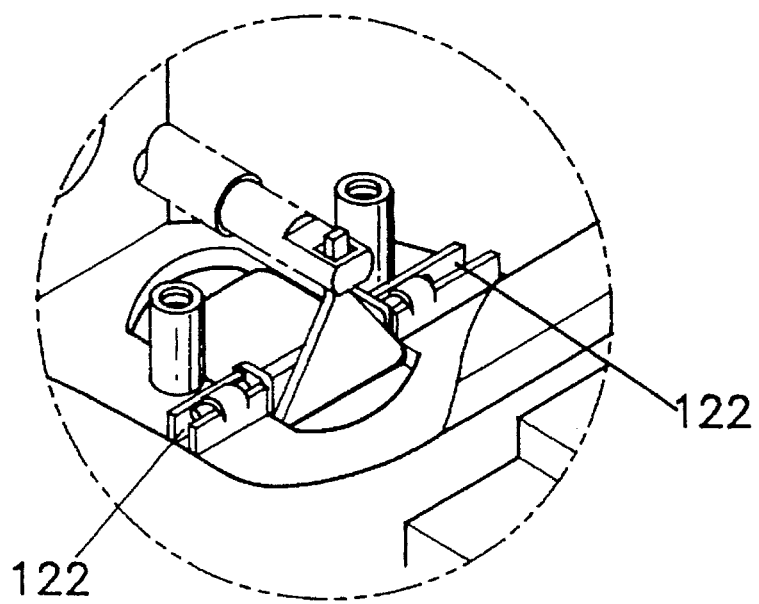
FIG. 4 shows a perspective view of an L-shaped transmission member employed in the direct pressure regulator according to the present invention.
Figure 6:
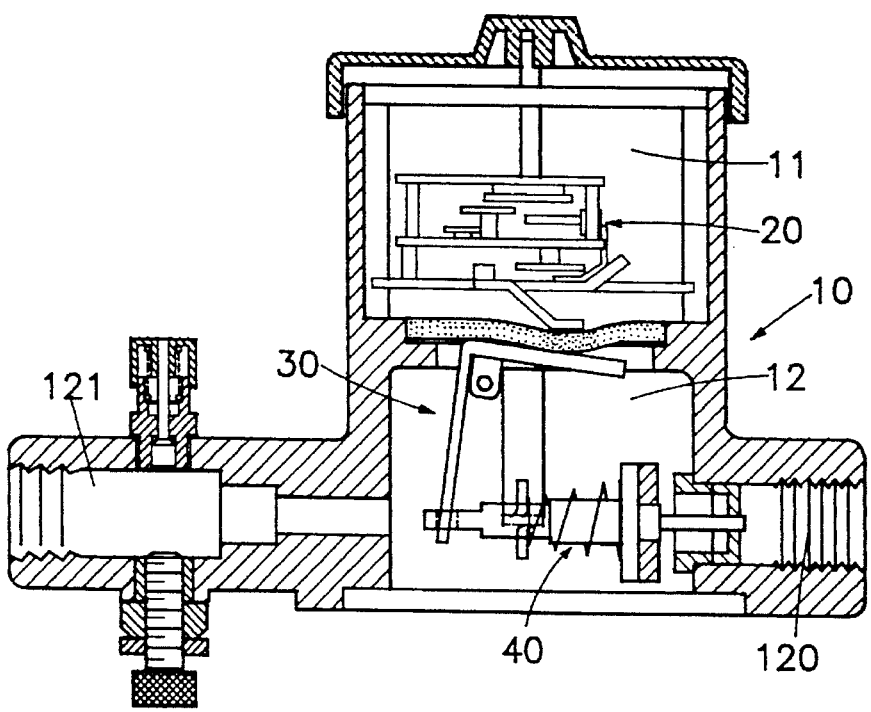
FIG. 6 shows a side view of the direct pressure regulator according to the present invention in opened condition.

Referring to FIG. 3 together with FIG. 6, the direct pressure regulator according to the present invention is housed in a casing 10 which includes a top chamber 11 and a bottom chamber 12. A timer device 20 is housed in the top chamber 11 and a gas inlet 120 and a gas outlet 121 are provided on the bottom chamber 12. It is an important aspect of the present invention that a direct pressure regulator 40 having an indirect-transmission member 30 is provided between the inlet 120 and the outlet 121.

The indirect-transmission member 30 includes a pivoted and L-shaped (side view) piece having a base portion 31 and a triangular portion 32 (acting as an actuating member described later) perpendicularly extended from one end of the base portion 31. The top of the triangular portion 32 is formed with a slender portion 321 acting as coupling means. A pair of ears 311 are provided on opposite sides of the base portion 31 near the bottom of the triangular portion 32, each having a through hole for a shaft 33 to pass therethrough so as to support the transmission member for pivoting. The ends of the shaft 33 are supported by two opposite slots 122 in the bottom chamber 12. To allow convenience in manufacture, after the shaft 33 is placed on the two slots 122, a punch can be applied onto the slots 122 so as to hold the shaft 33 securely on the slots 122.

The direct pressure regulator includes a valve body 42, an elastic sealing member 41, and a front element 1220. The front element 1220 is provided on the inlet 120 on the bottom chamber 12 and formed with a hole 1221 for supporting a valve bar 46 extended from the center of the valve body 42. The elastic sealing device 41 is coupled between the valve body 42 and the front element 120. A ring spring 43 is sleeved on the rear side of the valve bar 46. A hole 461 is provided on the valve bar 46 for engagement with the slender portion 321 on the L-shaped transmission member. The front end 462 of the valve bar 46 is formed with a smaller diameter to match the size of the hole 1221 so that it can be inserted into the hole 1221 to allow the valve bar 46 to be supported by the hole 1221. Similarly, the rear end 46A of the valve bar 46 is formed with a smaller diameter so that it can be inserted into a hole 441 formed on a supporting element 44 to allow the valve bar 46 to be supported by the hole 441. The supporting element 44 has two mounting holes 442 that allow it to be secured by screws 45 onto posts 123 on the bottom chamber 12. A rectangular opening 124 is formed within the bottom chamber 12, allowing a space for the movement of the L-shaped transmission member.

As shown in FIG. 3, the top chamber 11 includes an air-sealing member 111 on the rectangular opening 124. On top of the air-sealing member 111 there is provided a supporting member 112 for supporting a timer device 20. The supporting member 112 has a rectangular opening 1211 formed near the center. A pair of ears 1212 are formed on opposite sides of the rectangular opening 1211, which allows the vertical transmission member 113 to be pivoted thereon. The timer device 20 has one end of its axis provided with a cam 1141 used to drive a horizontal transmission member 1142. In normal conditions, the horizontal transmission member 1142 is urged by an elastic member (not shown) against the cam 1141. The timer device 20 is secured to posts (not shown) in the top chamber 11 by means of a U-shaped plate 115 and screws 116.

In operation, when the timer device 20 is started to work by turning the rotary handle 117, the cam 1141 is disengaged from the horizontal transmission member 1142 such that the horizontal transmission member 1142 is pushed outwards and press against the sloped portion 1131 of the vertical transmission member 113. This causes the tongue portion 1132 of the vertical transmission member 113 to press against the base portion 31 of the L-shaped indirect-transmission member 30, as illustrated in FIG. 6. As a result, the L-shaped indirect-transmission member 30 is rotated in the clockwise direction by a specific angle. At the same time, the slender portion 321 on the triangular portion 32 pulls the valve bar 46 on the direct pressure regulator 40 away from the hole 461 to the left, thereby opening the valve in the valve body 42 to allow the gas to flow in from the inlet 120 and onwards to the outlet 121. It can be clearly seen from FIG. 6 that the gas flow is directed in a straight route such that drawbacks caused by zigzag routes as in the prior art are not seen here.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A direct pressure regulator, comprising:
   (a) a casing having a top chamber and a bottom chamber, said bottom chamber including a gas passage having an inlet and an outlet;
   (b) an air-sealing member provided between said top chamber and said bottom chamber;
   (c) a timer device provided within said top chamber and having its axis provided with a cam driving a horizontal transmission member;
   (d) a supporting member for supporting said timer device within said top chamber;
   (e) a vertical transmission member having one end coupled to said timer device supporting member and used to convert horizontal movement of said horizontal transmission member into vertical movement;
   (f) a direct pressure valve provided at said outlet of said through gas passage in said bottom chamber said direct pressure valve including a valve body with an elastic sealing member having, a valve bar movably supported on a front supporting element provided on the outlet and a rear supporting element attached to the casing, an actuating hole provided on an end of said valve bar; and (g) an indirect transmission member provided within said bottom chamber, said indirect transmission member having an L-shape with a planar base portion forming one leg of the L-shape and a triangular portion forming the other leg of the L-shape and having a top formed with a slender portion extending into said actuating hole so as to couple the indirect transmission member to the direct pressure valve, said indirect transmission member being pivotally attached to the casing to pivot about an axis between the ends of the legs of the L-shape, said slender portion of said triangular portion being coupled to said actuating hole of said valve bar such that said indirect transmission member on one side of the air-sealing member is pivoted about said axis by the vertical movement of said vertical transmission member on an opposite side of the air-sealing member through said air-sealing member, said direct pressure valve being thus opened to allow gas to pass through from the inlet to the outlet of said gas passage.

2. A direct pressure regulator as claimed in claim 1, wherein said valve bar is biased by a ring spring which returns said valve to an original position after the power transmitted via said indirect transmission member to open said valve is removed.

* * * * *

UNITED STATES PATENT AND TRADEMARK OFFICE
CERTIFICATE OF CORRECTION

PATENT NO. : 5,551,474  
DATED : September 3, 1996  
INVENTOR(S) : Chuang et al

Page 1 of 3

Figure 5:
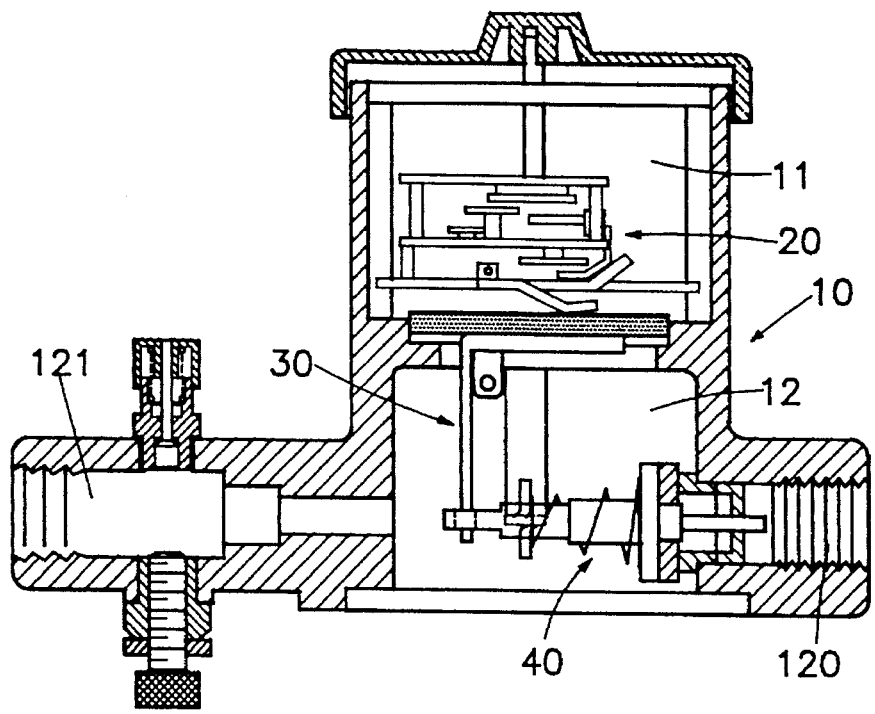
FIG. 5 shows a side view of the direct pressure regulator according to the present invention in closed condition.

It is certified that error appears in the above-indentified patent and that said Letters Patent is hereby corrected as shown below:

Delete Figure 5 and 6, and substitute therefor the Drawing Sheets, consisting of Figures 5 and 6, as shown on the attached pages.

Signed and Sealed this

First Day of April, 1997

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,551,474
DATED : September 3, 1996
INVENTOR(S) : Chuang et al

Page 2 of 3

It is certified that error appears in the above-indentified patent and that said Letters Patent is hereby corrected as shown below:

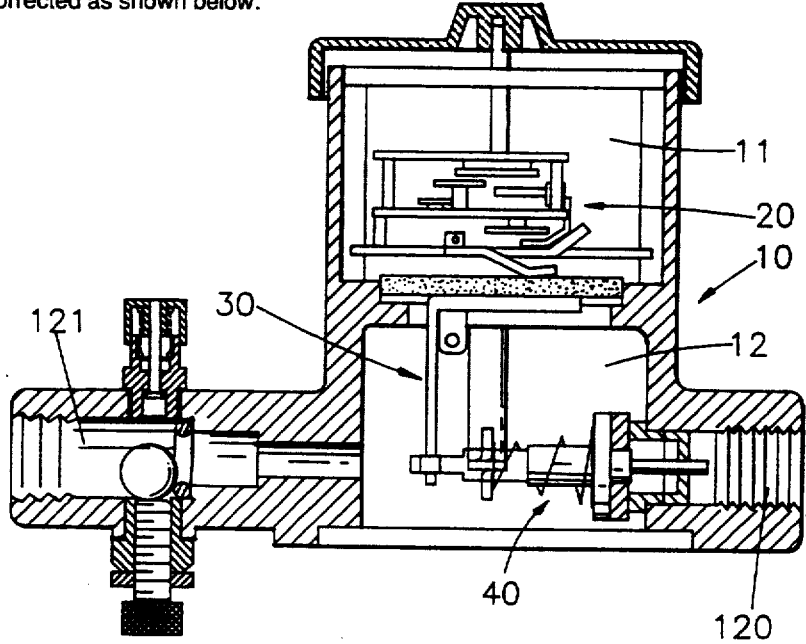

FIG. 5

UNITED STATES PATENT AND TRADEMARK OFFICE
CERTIFICATE OF CORRECTION

PATENT NO. : 5,551,474
DATED : September 3, 1996
INVENTOR(S) : Chuang et al.

It is certified that error appears in the above-indentified patent and that said Letters Patent is hereby corrected as shown below:

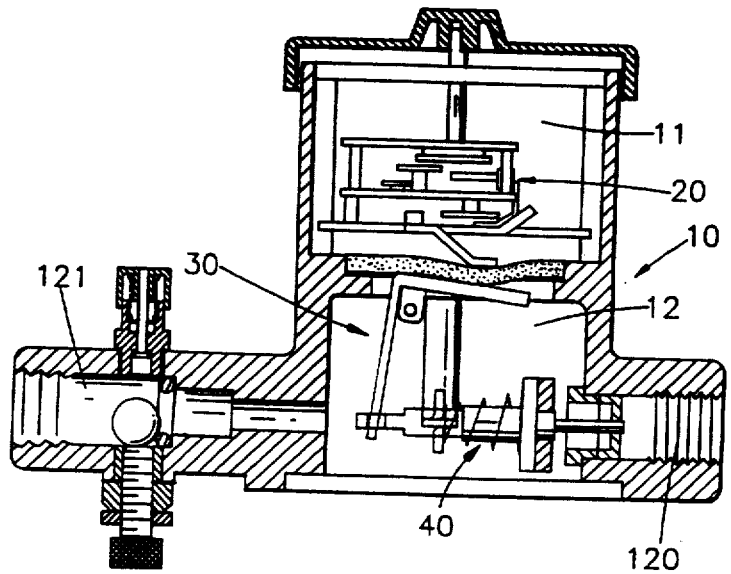

F.I G. 6